United States Patent
Takayanagi

(10) Patent No.: US 7,675,643 B2
(45) Date of Patent: Mar. 9, 2010

(54) PRINT CONTROLLER, CONTROL METHOD THEREFOR AND PROGRAM

(75) Inventor: Masahiro Takayanagi, Takasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 11/386,726

(22) Filed: Mar. 23, 2006

(65) Prior Publication Data
US 2006/0227372 A1 Oct. 12, 2006

(30) Foreign Application Priority Data
Apr. 11, 2005 (JP) .............................. 2005-113953

(51) Int. Cl.
*G06F 3/12* (2006.01)
(52) U.S. Cl. .................... 358/1.15; 358/1.14; 358/1.16; 358/1.17
(58) Field of Classification Search ............. 455/412.1; 358/1.15, 1.5, 1.13, 1.16, 1.17; 347/17, 14
See application file for complete search history.

(56) References Cited

U.S. PATENT DOCUMENTS

| 6,636,325 B1* | 10/2003 | Kurase .................. 358/1.14 |
| 6,665,082 B1* | 12/2003 | Takeoka et al. ........... 358/1.15 |
| 7,057,745 B1* | 6/2006 | Tanaka et al. ............ 358/1.1 |
| 7,110,132 B2 | 9/2006 | Takayanagi ............. 358/1.15 |
| 2002/0021320 A1* | 2/2002 | Miyazawa ............... 347/19 |
| 2005/0083917 A1 | 4/2005 | Okamoto | |
| 2005/0248600 A1* | 11/2005 | Sakamoto ............... 347/14 |

FOREIGN PATENT DOCUMENTS

| JP | 10-91375 | 4/1998 |
| JP | 11-301040 | 11/1999 |
| JP | 2000-135820 | 5/2000 |
| JP | 2004-173332 | 6/2004 |
| JP | 2004-180253 | 6/2004 |

OTHER PUBLICATIONS

Japanese Office Action dated Jul. 21, 2009 in corresponding Japanese Application No. 2005-113953.

* cited by examiner

*Primary Examiner*—Charles N Appiah
*Assistant Examiner*—Michael T Vu
(74) *Attorney, Agent, or Firm*—Fitzpatrick, Cella Harper & Scinto

(57) ABSTRACT

A printer controller performs processing of a print job by a processor which realizes various processings by executing a program, and by a hardware circuit which interacts with the processor. A part of hardware circuit is configured as a determination circuit which determines a type of a packet stored in a memory for reception, on the basis of data in a particular part of the packet. When the packet is determined to be a command packet, the hardware circuit provides the packet for the processor. When the packet is determined to be a data packet, the hardware circuit transfers print data in a data part of the packet to a memory for image processing.

11 Claims, 15 Drawing Sheets

FIG. 4

| COMMAND TYPE | CONTENTS |
|---|---|
| 0 × 20 | RESOLUTION DESIGNATION |
| 0 × 30 | SHEET SIZE DESIGNATION |
| 0 × 50 | TONER AMOUNT DESIGNATION |
| 0 × 60 | PAGE START COMMAND |
| 0 × 70 | PAGE END COMMAND |
| 0 × F0 | PRINT DATA TRANSFER |

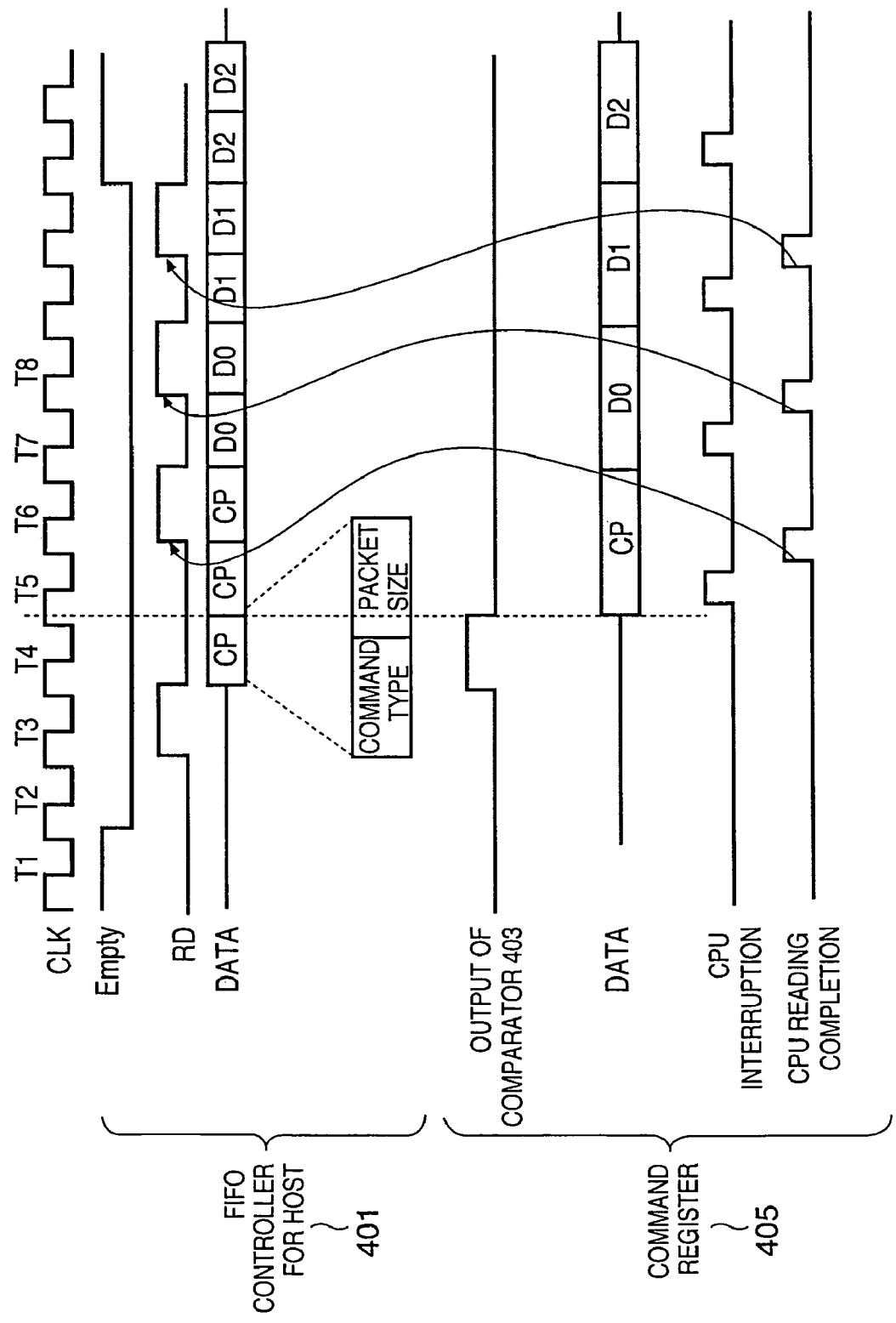

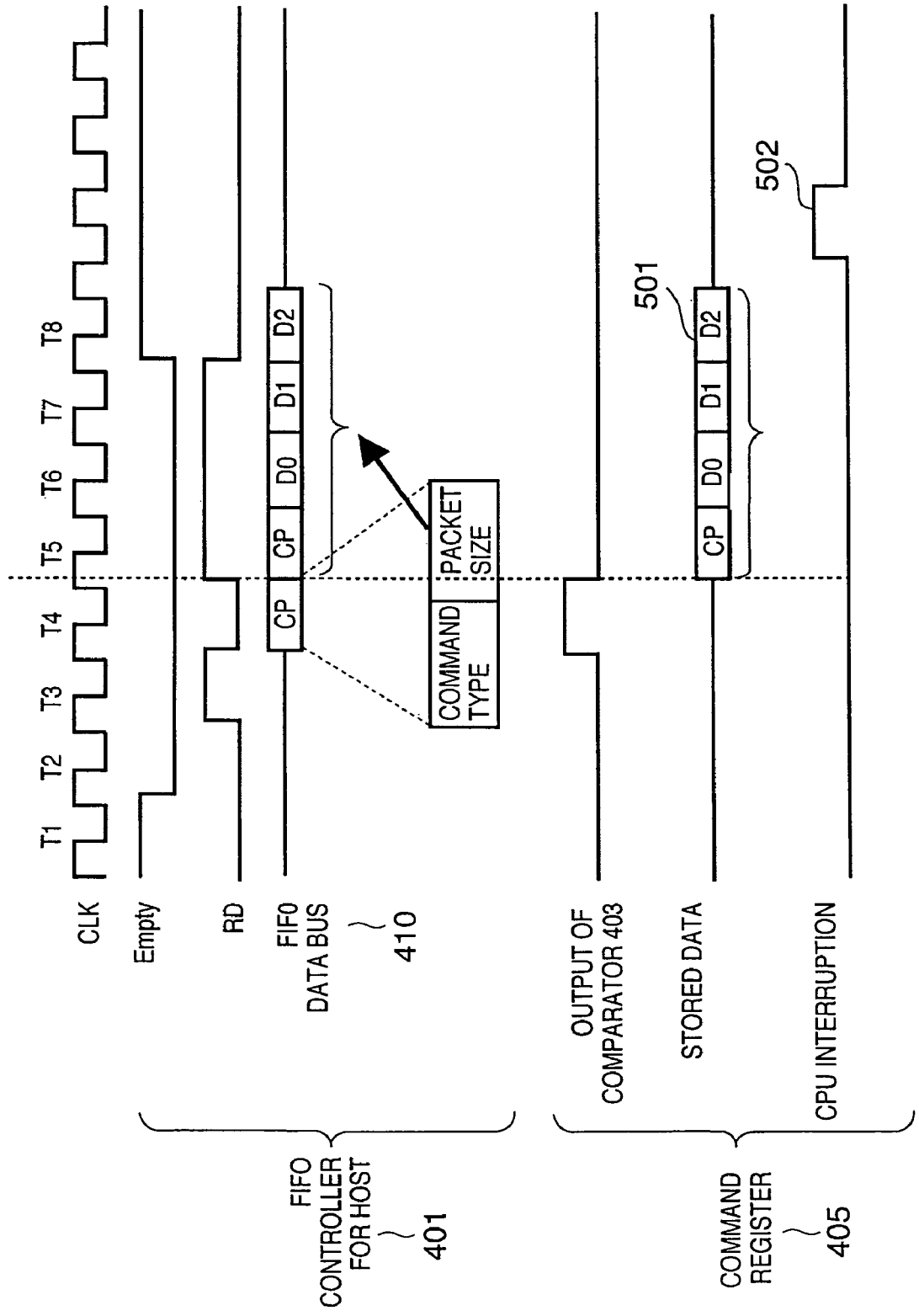

PRINT CONTROLLER, CONTROL METHOD THEREFOR AND PROGRAM

FIELD OF THE INVENTION

The present invention relates to a technique for speeding up the processing of data received from a host computer in a printer which performs image formation on the basis of print data transferred from the host computer.

BACKGROUND OF THE INVENTION

A printer which receives a print job transmitted from an external apparatus such as a host computer and performs print processing, is generally well known. The print job received by the printer of this type includes various types of data. For example, the data received as the print job may be command data designating the resolution, or image data to be developed into an image. Therefore, when the printer performs processing of the print job transmitted from the external apparatus, such as the host computer, first, the printer needs to discriminate the type of received data. Further, the printer needs to discriminate the type of received data at a high speed in order to improve the throughput in the printer. The high speed discrimination of the type of received data is also essential for promptly responding to an inquiry about the printing state.

As a method for discriminating what the received data is, there is disclosed a method in Japanese Patent Laid-Open No. 11-301040, in which once the job start is detected, the received data is interpreted byte by byte to identify what the received data is, until the job end is detected. Also, there is disclosed a method in Japanese Patent Laid-Open No. 2000-135820 in which the type of data is determined per a packet.

However, in the method as disclosed in the Japanese Patent Laid-Open No. 11-301040, a processor (CPU) which performs overall control of the printer, determines the type of data per a byte in accordance with incorporated program codes, so that the processing load of CPU is increased. Even when the type of data is determined per a packet as disclosed in Japanese Patent Laid-Open No. 2000-135820, the discrimination processing is still performed by the CPU, so that the processing load of CPU is also increased. The processing time that the CPU takes to determine the type of received data, that depends on the performance of the CPU, may become about several milliseconds. For this reason, the determination processing of the type of data performed by the CPU affects the processing time of the print job as a whole.

The processing time can be reduced to some extent by increasing the speed of CPU, but which generally causes an increase of the cost. The so-called host base printer which receives a print job from an external host computer and performs printing, is strongly required to be low cost. Thus, an inexpensive CPU is used for such printer, which is a design requirement. For this reason, in the host base printer, the solution to realize the processing time reduction by using an expensive and high-speed CPU is impractical.

Further, a method for increasing the amount of data sent by one packet may be considered in order to reduce the time for determining the type of data. This is because the number of determinations as to the type of data can be reduced as the amount of data per one packet is increased. However, the increase in the amount of data per one packet causes an increase in the capacity required for the FIFO memory for storing the packet, which also becomes a hindrance to the cost reduction. For example, in order to maintain the low cost, the capacity of the FIFO memory is preferably reduced to for example about one several tenth of the amount of memory corresponding to one page. However, the number of determination of the type of data cannot be sufficiently reduced by such capacity of the FIFO memory.

As described above, there is a problem to be solved in order to realize a printer which is low cost and capable of performing data processing at a high speed. That is, although a printer which is low cost and capable of performing data processing at a high speed is demanded, an effective measure to realize the demand has not yet been found.

SUMMARY OF THE INVENTION

The present invention relates to a printer reducing the processing load of a processor which executes a program to perform various processings, and enables to discriminate the type of received data at a high speed.

According to one aspect of the present invention, there is provided a print controller for processing a print job by a processor which realizes various processings by executing a program, and by a hardware circuit which interacts with the processor, the print controller comprising: a determination unit which is constituted by the hardware circuit and which determines a type of a packet received from an external apparatus and stored in a first memory, on the basis of data in a particular part of the packet; and a recording control unit which causes recording to a recording medium on the basis of data determined as a packet of print data by the determination unit to be performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a figure showing examples of the packet type;

FIG. 7A is a timing chart at the time of command packet processing in the header analyzer according to the first embodiment;

FIG. 7B is a timing chart at the time of the command packet processing in the header analyzer according to the second embodiment;

DETAILED DESCRIPTION OF THE PREFERRED EMBODIMENTS

Preferred embodiments of the present invention will now be described in detail in accordance with the accompanying drawings.

In the following, preferred embodiments according to the present invention are described with reference to the accompanying drawings.

First Embodiment

Figure 1:
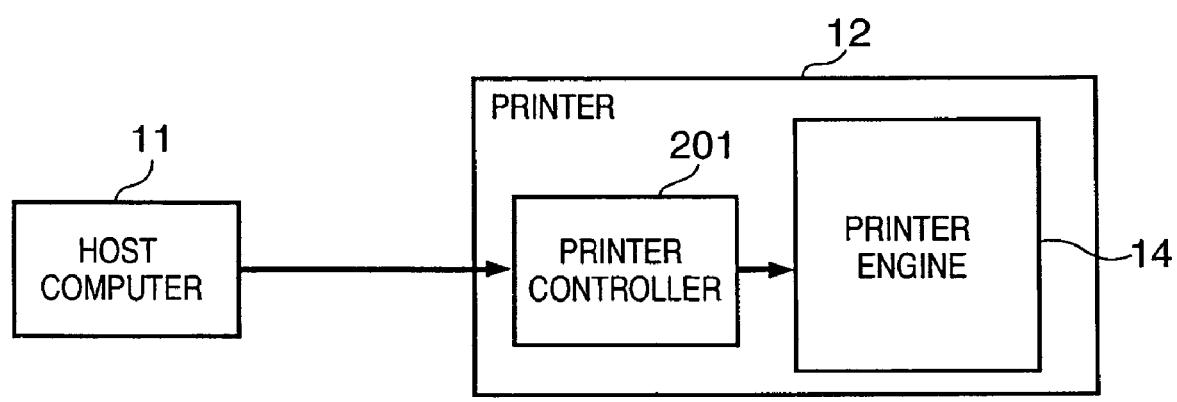
FIG. 1 is a figure showing a configuration of a print system according to an embodiment.

FIG. 1 is a figure showing an exemplary configuration of a print system including a printing device (printer) according to the present embodiment. A printer 12 is a so-called host base printer, which receives a print job from a host computer 11 by, for example, a USB™, so as to form an image on a recording medium, such as a paper. The host computer 11 generates print bit map data based on information to be printed by executing an application software. The host computer 11 compresses the print bit map data in order to improve the transfer efficiency, and transfers the compressed data (print data) as a print job to the printer 12. Upon receipt of the print job, a printer controller 201 performs image processing such as to apply the decompression processing to the print data included in the print job, and to make the print data restored to the original bit map image. Then, the restored bit map image is sent to a printer engine 14 which performs a printing operation in practice, so as to be printed. Note that all types of known systems such as the electrostatic printing system by a laser beam and an ink jet system can be applied to the printer engine 14. Further, only one host computer is connected to the printer 12 in FIG. 1, but plural host computers may be arranged to be connected to the printer 12 via a network.

The print job is transmitted from the host computer 11 to the printer 12 in the form of a packet. Note that the packet herein refers to a packet in higher-order layers than the data link layer, (as well as in each embodiment described below). Since the print job includes a command and print data as described above, the printer controller 201 needs to discriminate the data type of each packet of the received print job. For example, the printer controller 201 discriminates whether the received packet is a command packet or a data packet. As a result of the discrimination, when the received packet is a command packet relating to the job or the printer, the printer controller 201 performs processing in accordance with the contents of the command packet. When the received packet is a data packet, that is, image data to be printed, the printer controller 201 applies a decompression processing to the data packet and transfers it to the printer engine 14. The data packet includes image data to be printed, and the command packet includes commands relating to the job or the printer, such as a sheet size designation command, a resolution designation command and a page start command.

Figure 2:
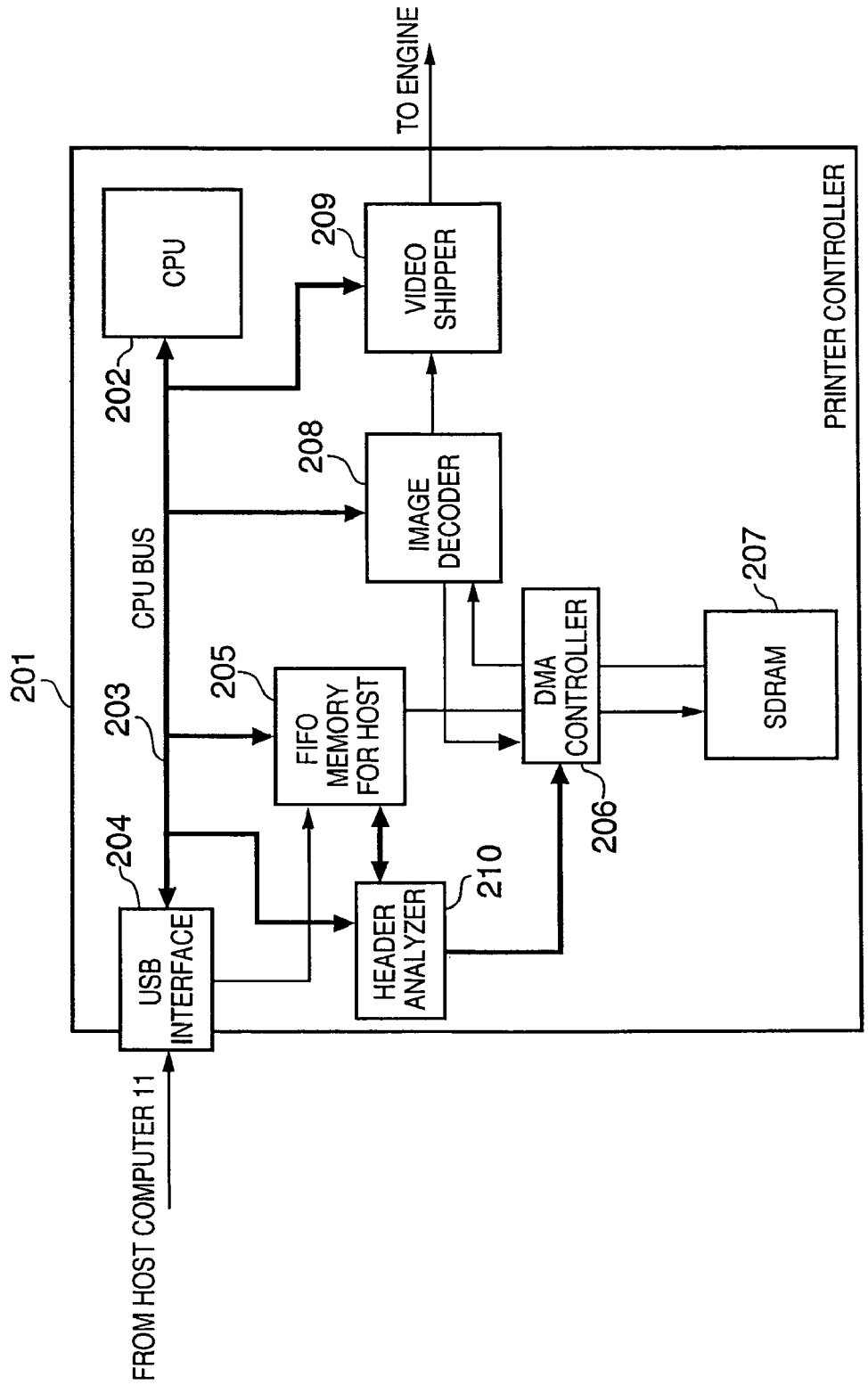
FIG. 2 is a block diagram showing a configuration of a printer controller according to a first embodiment.

FIG. 2 is a block diagram showing a configuration of the printer controller 201 in the printer 12 according to the present embodiment. In FIG. 2, a CPU 202 performs overall control of the printer controller 201 in accordance with a control program stored in a memory (not shown). A USB interface 204 is an interface to the host computer 11. A FIFO memory 205 for host temporarily stores data received via the USB interface 204. A DMA (Direct Memory Access) controller 206 controls DMA of a SDRAM 207. The SDRAM 207 serves as a main memory of the controller. An image decoder 208 decompresses image data (compressed image) to be printed which is received from the host computer 11 and stored in the SDRAM 207. A video shipper 209 transfers the image data restored by the image decoder to the printer engine 14. A header analyzer 210 analyzes the header part of the received packet so as to perform necessary processing. The header analyzer 210 will be described below. A CPU bus 203 connects the CPU 202 with each of the above described sections (the USB interface 204, the FIFO memory 205 for host, the image decoder 208, the video shipper 209, the header analyzer 210 and the like).

Next, the flow of processing performed by the printer controller 201 having the above described configuration is explained.

A print job including print data (compressed image data) and a command which are generated by the host computer 11, is received via the USB interface 204. In this case, the print job is transferred in the unit of packets. The FIFO memory 205 for host sets a packet reception flag when completing reception of one packet. A signal indicating the state of the reception flag is transmitted to the header analyzer 210. When the reception flag is set, the header analyzer 210 reads and analyzes the header part of the received packet, so as to judge whether the packet is a command packet or a data packet. When the packet is the command packet, the processing is entrusted to the CPU 202.

On the other hand, when the packet is the data packet, the header analyzer 210 starts the DMA controller 206 and thereby transfers the data from the FIFO memory 205 for host to the SDRAM 207 without the intervention of the CPU 202. In the present embodiment, (compressed) image data to be printed are stored in the data packet. Therefore, (compressed) image data to be printed are accumulated in the SDRAM 207 by this processing. The image decoder 208 itself starts the DMA controller 206, and thereby the image data accumulated in the SDRAM 207 are taken into the image decoder 208 by DMA. The image decoder 208 applies decompression processing to the received image data so as to generate bit map data. The video shipper 209 receives the bit map data generated by the image decoder 208 so as to transmit the bit map data to the printer engine 14.

Next, the configuration and operation of the header analyzer 210 are explained in detail.

Figures 3A, 3B:
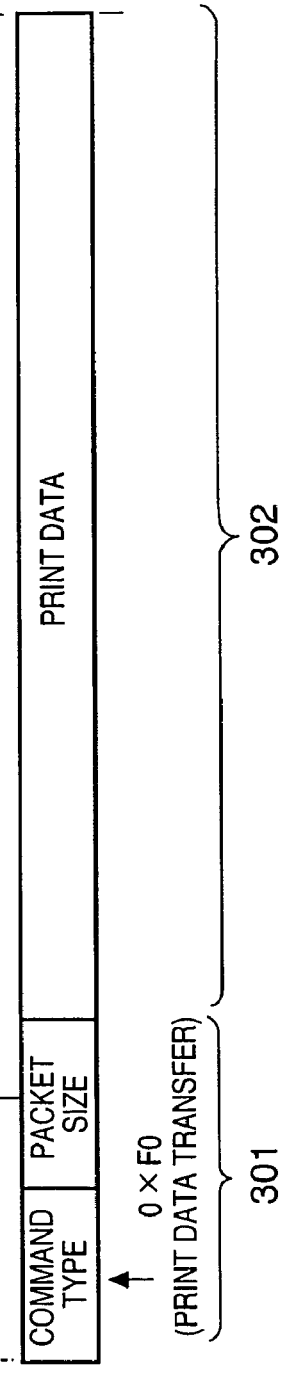
FIG. 3A and FIG. 3B are figures explaining the packet configuration of a host base printer.

The packet received from the host computer 11 has a structure as shown in FIG. 3A and FIG. 3B, and consists of a header part 301 and a data part 302, which are designated by first several bytes of the packet. FIG. 3A shows a basic structure of the command packet, and FIG. 3B shows a basic structure of the data packet. As can be seen from FIG. 3A and FIG. 3B, the command packet and the data packet have the same basic structure, and are mainly different in the size of the data part 302. For example, the size of the data part 302 of the command packet is small (for example, several bytes), while the size of the data part 302 of the data packet is large (for example, several kbytes).

Information indicating the type of command is stored in the "command type" in the header part 301. On the basis of the contents of the "command type", it is possible to judge whether the packet is the data packet or the command packet. Further, the CPU 202 receiving the command packet can judge what type of command the received packet is, from the contents of the command type. FIG. 4 shows examples of the command type. The command type by which the received packet is discriminated as the command packet includes, for example, "resolution designation", "sheet size designation", "toner amount designation", "page start command", "page end command" and the like. These packets are sent to the CPU 202, and the CPU 202 performs processing in accordance with the contents of the packets. In the case of the command packet, the size of the data part 302 is 0 to several bytes. On the other hand, when the "command type" is "print data transfer" in the present embodiment, the packet is discriminated to be the data packet. In the case of the data packet, the size of the data part 302 is several tens kbytes. In the header part 301, the "packet size" indicates the data size of the data part 302, or the data size of the whole packet including the header part 301 and the data part 302, (as well as in the header part in each embodiments described below).

Figure 5A:
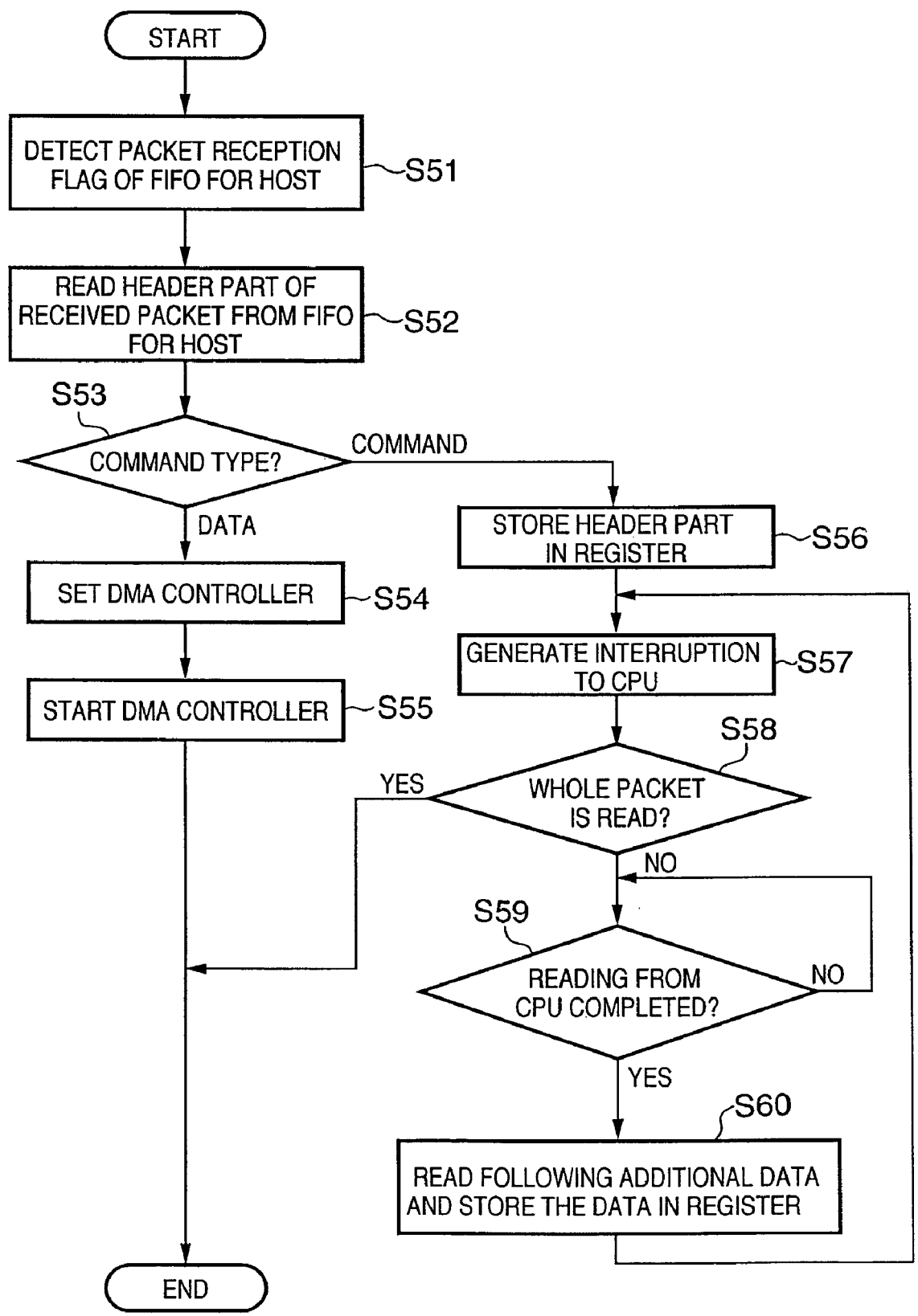
FIG. 5A is a flow chart explaining received packet processing according to the first embodiment.

Next, the flow of processing performed by the header analyzer 210 is explained by means of a flow chart shown in FIG. 5A. As described above, upon receipt of the packet, the FIFO memory 205 for host sets the reception flag. The header analyzer 210 detects the reception of the packet by monitoring the reception flag in step S51. Next, in step S52, the header analyzer 210 reads the header part 301 from the FIFO memory 205 for host. In step S53, the header analyzer 210 determines whether the packet is the command packet or the data packet on the basis of the contents of the "command type" included in the header part 301.

The determination of the packet type on the basis of the command type is performed as described above. When the packet is determined to be the command packet in step S53, the header analyzer 210 advances to step S56 and stores the data of the header part currently outputted from the FIFO memory 205 for host in a register (as will be described below with reference to FIG. 6). Then, in step S57, the header analyzer 210 generates an interruption to the CPU 202, so as to inform the CPU 202 of the data of the header part read in step S52. The CPU 202 accesses the header analyzer 210 in order to acquire the data (the header part of the command packet) currently outputted by the FIFO memory 205 for host, in response to this interrupt signal.

Subsequently, the header analyzer 210 repeats the processing from step S57 to step S60 to provide the CPU 202 with following additional data (additional data of the data part 302) from the FIFO memory 205 for host. Here, the provision of data may be performed in a manner that the data stored in the FIFO memory 205 are made to be read by the CPU 202, or that the data to be provided are stored in a memory area from which the CPU 202 can read, so as to make the CPU 202 read the stored data.

In some types of the command packet, the "additional data" may not exist. Therefore, in step S58, the header analyzer 210 determines whether the remaining additional data is present in the packet or not, on the basis of the "packet size" of the header part 301 read in step S52. For example, when the "packet size" in the header part 301 indicates the data size of the whole packet, the header analyzer 210 determines the presence of the additional data on the basis of whether a value obtained by subtracting the size of the header part 301 from the data size is equal to zero or more than zero. When the additional data is present, the header analyzer 210 waits for the input of "reading completion" indicating completion of the reading processing based on the previous interrupt signal, from the CPU 202 in step S59. When the "reading completion" is inputted, the header analyzer 210 makes the additional data the FIFO memory 205 for host output in step S60, and stores the outputted data in the register. Then, the header analyzer 210 returns to step S57 and generates an interrupt signal again in order to make the CPU 202 read the additional data stored in the register. In response to the interrupt signal, the CPU 202 accesses the header analyzer 210 so as to acquire the command packet. The header analyzer 210 repeats such processing in accordance with the data amount indicated by the data size described in the header part of the command packet, thereby enabling the CPU 202 to acquire the whole command packet.

On the other hand, when the received packet is the data packet, the process proceeds to step S54 from step S53. In step S54, the header analyzer 210 performs transfer of image data from the FIFO memory 205 for host to the SDRAM 207, which transfer is performed by the DMA controller 206 without the intervention of the CPU 202. Specifically in step S54, the header analyzer 210 sets in the DMA controller 206 the amount of data calculated from the "packet size" in the header part 301 shown in FIG. 3B) to be transferred from the FIFO memory 205 for host, and the transfer destination address (the SDRAM 207). Then, the header analyzer 210 starts the DMA controller 206 in step S55. The DMA controller 206 operates in the state set in step S54, thereby making the data in the data part 302 of the data packet successively transferred from the FIFO memory 205 for host to the SDRAM 207. As a result, the DMA transfer of data in the data part 302 of the data packet to the SDRAM 207 is performed by the DMA controller 206. The information of the header part 301 read in step S52 is discarded after the start of the DMA in step S55. As described above, the data stored in the SDRAM 207 is supplied as a video signal to the printer engine 14 by the coder 208 and the video shipper 209 so as to be formed as a visible image on a recording medium.

Next, the detailed configuration and operation of the header analyzer 210 which realizes the above described processing are explained with reference to FIG. 6, FIG. 7A and FIG. 8.

Figure 6:
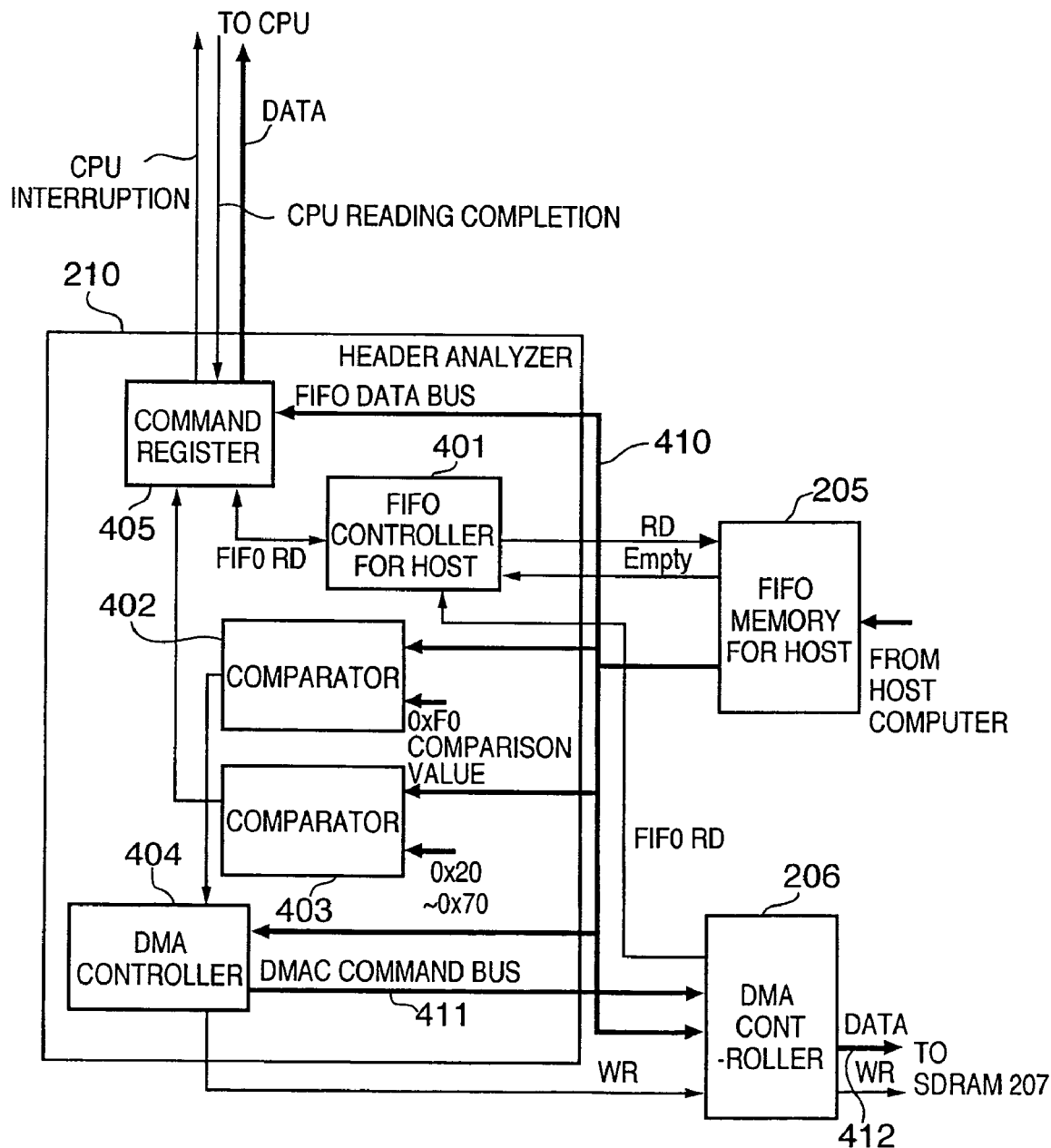
FIG. 6 is a block diagram showing a configuration of a header analyzer according to the first embodiment.

FIG. 6 is a block diagram showing a detailed configuration of the header analyzer 210 according to a first embodiment. A FIFO controller 401 for host controls the FIFO memory 205 for host. A comparator 402 determines whether the received packet is a print data packet or not, by comparing the contents of the command type in the header part 301 of the received packet with predetermined data. The data used for the comparison in the comparator 402 is "0xF0" as explained in FIG. 4. Further, a comparator 403 determines whether the received packet is the command packet or not, by comparing the contents of the command type in the header part 301 of the received packet with predetermined data. In the present embodiment, the data used for the comparison in the comparator 403 are "0x20", "0x30", "0x50", "0x60" and "0x70", as explained in FIG. 4. Note that the inverted output of the comparator 402 may be arranged to be supplied to a command register 405. Alternatively, the inverted output of the comparator 403 may be arranged to be supplied to the command register 405.

A DMAC controller 404 controls DMA operation performed by the DMA controller 206 such as by making the transfer data amount and the transfer destination address set in the DMA controller 206. The command register 405 stores data successively read from the FIFO memory 205 for host and generates an interrupt signal to the CPU 202.

Figure 8:
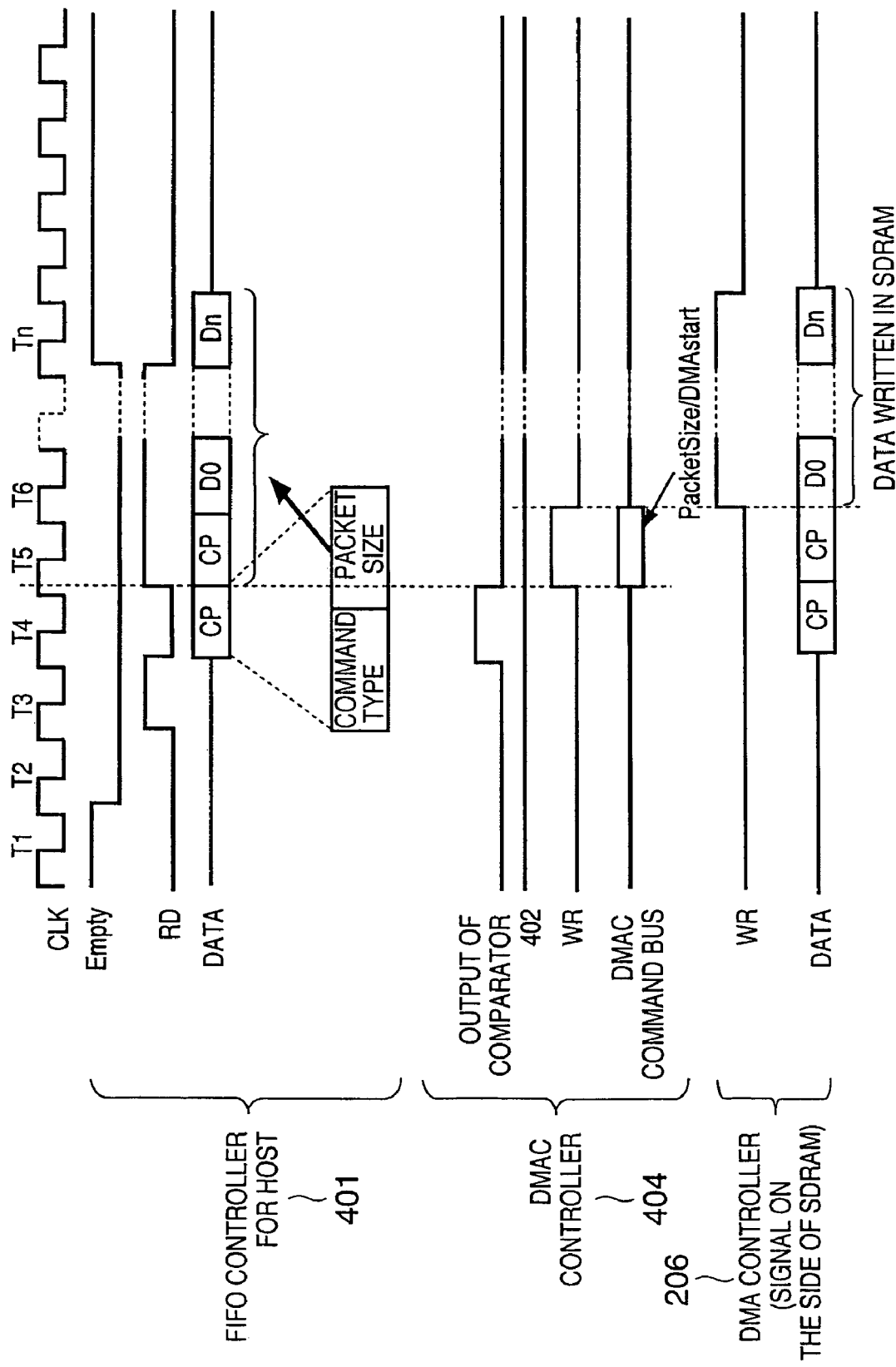
FIG. 8 is a timing chart at the time of the data packet processing in the header analyzer according to the first embodiment.

FIG. 7A is a timing chart representing the processing of the command packet in the printer controller 201 according to the first embodiment, and FIG. 8 is a timing chart representing the processing of the image data packet in the printer controller 201.

First, the command packet processing is explained by using FIG. 7A. A packet received from the host computer is stored in the FIFO memory 205 for host. When the packet exists in the FIFO memory 205 for host, an Empty signal from the FIFO memory 205 for host is made Inactive (in the timing of T2). This means that the packet is received. In the present embodiment, this Empty signal is used as a reception flag in step S51. When the Empty signal is made Inactive, the FIFO controller 401 for host makes a RD signal Active, in order to read the received data from the FIFO memory 205 for host (T3). The header part 301 of the received packet is read from the FIFO memory 205 for host by this RD signal (step S52). At this time, the header information 301 is outputted to a FIFO data bus 410 (T4). Note that the data amount transferred from the FIFO memory 205 for host by one reading operation based on the RD signal is set to 16 bits (of course, may be set to 8 bits or 32 bits).

As explained in FIG. 3, the command type and the packet size are stored in the read header part 301. The comparator 402 and the comparator 403 judge whether the received packet is the command packet or the data packet on the basis of the contents of the command type (step S53). When the received packet is the command packet, the output of the comparator 403 is made Active (T4). In response to the Active output of the comparator 403, the command register 405 first stores the data of the header part 301 currently outputted on the FIFO data bus 410, and generates an interrupt signal to the CPU 202 (T5) (steps S56, S57). Then, in response to the reading completion from the CPU 202, the command register 405 successively reads the additional data from the FIFO memory 205 for host, and interrupts the CPU 202 (steps S58 to S60). In this way, the whole command packets read by the CPU 202. The data reading operation from the FIFO memory 205 for host is performed on the basis of a FIFORD signal. That is, the FIFO controller 401 for host outputs the RD signal in accordance with the FIFORD signal so as to realize the above described reading operation from the memory.

When the whole command packet is read by the CPU 202, as described above, the processing of the received packet is completed.

Next, the operation of the header analyzer 210 when the received packet is the data packet (print data packet), is explained by using FIG. 8. Similarly to the case of the command packet, a packet received from the host computer 11 is first stored in the FIFO memory 205 for host. When the received packet exists in the FIFO memory 205 for host, the Empty signal of the FIFO memory 205 for host is made Inactive (T2). This means that the packet is received. Therefore, the FIFO controller 401 for host makes the RD signal Active, in order to read the received data from the FIFO memory 205 for host (T3). The header part 301 of the received packet is read from the FIFO memory 205 for host by this RD signal. The read data of the header part 301 is stored in the command register 405, and the contents of the command type are supplied to the comparators 402, 403.

As explained in FIG. 3A and FIG. 3B, the command type and the packet size are stored in the read header part 301. In accordance with the contents of the command type, the comparator 402 and the comparator 403 judge whether the received packet is the command packet or the data packet. When the received packet is the data packet (when the command type=0xF0), the output of the comparator 402 is made Active (T4). In response to the Active output from the comparator 402, the DMAC controller 404 acquires the data size of the header information 301 currently outputted on the FIFO data bus 410, and determines the transfer data amount. Then, the DMAC controller 404 sets the transfer data amount determined as described above and the address of the SDRAM 207 which is the transfer destination of the data, in the DMA controller 206 via a DMAC command bus 411 (step S54), and starts the DMA controller 206 (step S55). The instructions for setting and starting to the DMA controller 206 are performed by writing predetermined data in the DMA controller 206 by using the DMAC data bus 411 and the WR signal. The DMA controller 206 which is started, performs DMA transfer of the data part 302 of the received packet stored in the FIFO memory 205 for host to the SDRAM 207 in accordance with the contents set by the DMAC controller 404 (T5 to Tn). More specifically, the DMA controller 206 controls the FIFO controller 401 for host by the FIFORD signal, and successively reads image data from the FIFO 205 for host. Then, the DMA controller 206 controls the WR signal on the side of the SDRAM 207 and stores the image data in the SDRAM.

As described above, according to the first embodiment, the discrimination of the packet type is performed by hardware (without the intervention of CPU processing). Thereby, the discrimination processing of the packet type need not be performed by the CPU 202, as a result of which the overhead between packet communications can be significantly reduced and the communication speed can be increased.

Figures 9A, 9B:
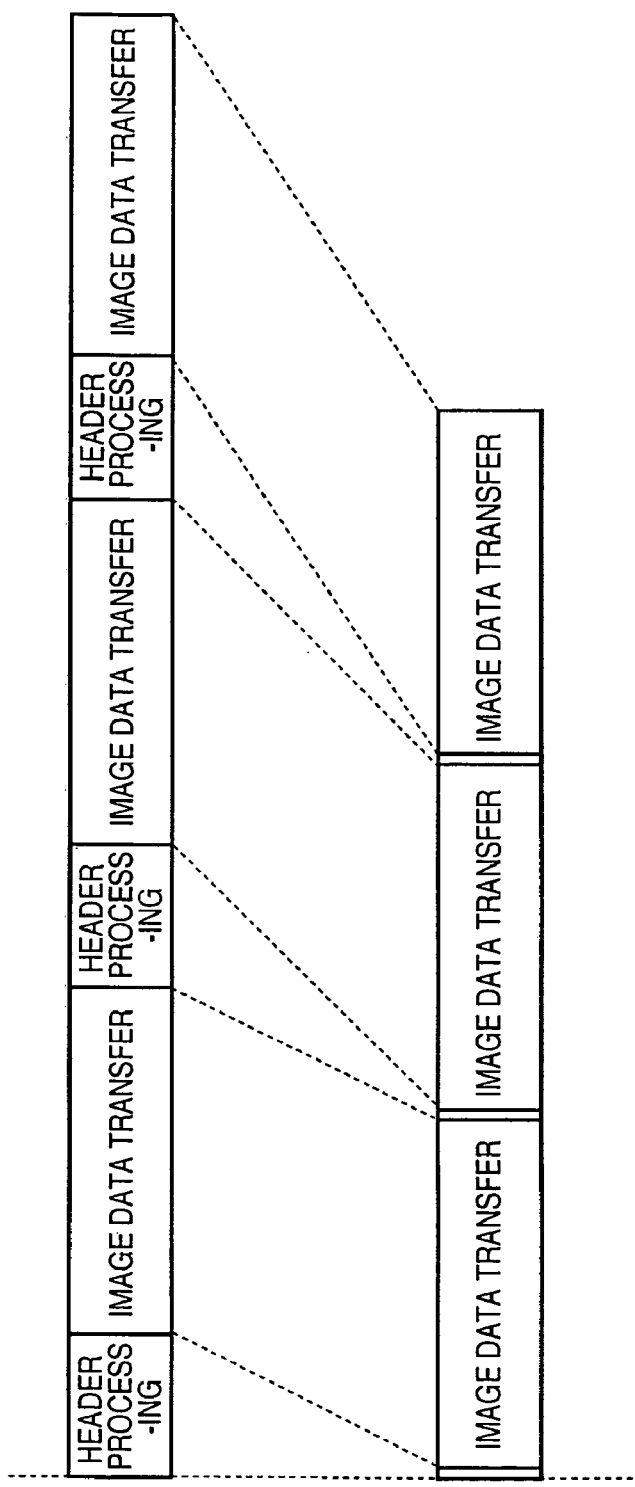
FIG. 9A and FIG. 9B are figures explaining a reduction in the received packet processing time according to the first embodiment.

That is, in the above described configuration, hardware for judging the type of received packet is constituted, and when the hardware judges that the received packet is the command packet, the processing of the packet is entrusted to the CPU 202. On the other hand, when the hardware judges that the received packet is the data packet, image data obtained by removing the header part and the like are transferred to the processing circuit (the SDRAM 207) connected to the printing engine. In the series of processing, there is no intervention of the CPU 202, so that the processing speed is significantly improved, and the processing speed as a system (printing speed) is also improved. This situation is explained by FIG. 9A and FIG. 9B. Note that the intervention of the CPU 202 is excluded after the data transfer is started, and the operation for setting registers and the like is performed by the CPU 202 in relation to the initialization of the processing circuit. However, such operation performed by the CPU 202 has almost no effect on the processing speed of the system. For example, the time required for determining the packet type at the time of the image data transfer performed by an ordinary printer controller, as shown in FIG. 9A, is reduced as shown in FIG. 9B. That is, it can be seen that the time (of header processing) that the CPU 202 takes to analyze the header part 202 and to thereby determine the data type, is reduced to almost zero, as a result of which the whole processing time is shortened.

In more detail, the CPU needs a number of execution clocks for fetching an instruction, reading/writing object data, performing an internal arithmetic operation and the like, in order to execute one instruction. The execution steps of the CPU which are needed for the capturing processing of the received packet, include starting an interrupting operation, reading the header part from the FIFO memory, discriminating the packet type, and starting the DMA. In the steps, the time required for discriminating the packet type becomes several ms. On the other hand, according to each of the above described embodiments, the discrimination of the packet type can be performed by the circuit provided independently of the CPU at a processing speed requiring several clocks, so that the processing speed can be significantly improved by the circuit of small-scale.

Further, as in the above described embodiments, the discrimination of the packet type can be performed by the circuit provided independently of the CPU 202, so that the CPU 202 mainly plays the roles of (1) communicating with the host computer, and (2) setting operation control registers in each of the function blocks (the USB interface, the image decoder, the video shipper) in the printer controller. Many of these roles are processing operations causing no problem, even if the CPU needs processing time in order to perform the processing operations. On the other hand, the header analyzer 210 which operates independently of the CPU 202 plays the roles of (1) recognizing the presence of the received packet, (2) reading the header part of the packet, (3) discriminating the packet type, (4) in the case of the data packet, starting the DMA and transferring the data part of the packet to a subsequent stage, and (5) in the case of the command packet, entrusting the processing of the packet to the CPU. In this way, the header analyzer 210 performs the processing that the CPU 202 takes an appreciable amount of time to perform at the time of packet reception, as a result of which the processing speed can be effectively increased. Further, an expensive and high-speed CPU need not be used, so that an inexpensive and high-speed printer can be constituted. Note that when the processing of the command packet is entrusted to the CPU, the command packet as a whole may be arranged to be transferred to a suitable area, which transfer is then notified to the CPU, as explained in the following second and third embodiments.

Second Embodiment

In the above described first embodiment, the capacity of the command register 405 is set to the amount of data outputted by one read operation from the FIFO memory 205 for host, and the data read from the FIFO memory 205 for host by each read operation are arranged to be acquired by the CPU 202. Therefore, the data acquiring operation is performed by the CPU 202 at each read operation from the FIFO memory for host. A second embodiment is configured such that the capacity of the command register 405 is set to at least a size in which the command packet as a whole can be stored, and that the CPU 202 is made to read the whole command packet from the command register 405 by generating one interruption. Note that the configuration of a printer, a printer controller and a header analyzer is the same as that of the first embodiment. Further, the data size of the command packet does not become so large, and hence, even if the whole command packet is arranged to be stored in the command register 405, the capacity of the command register 405 does not become so large.

Figure 5B:
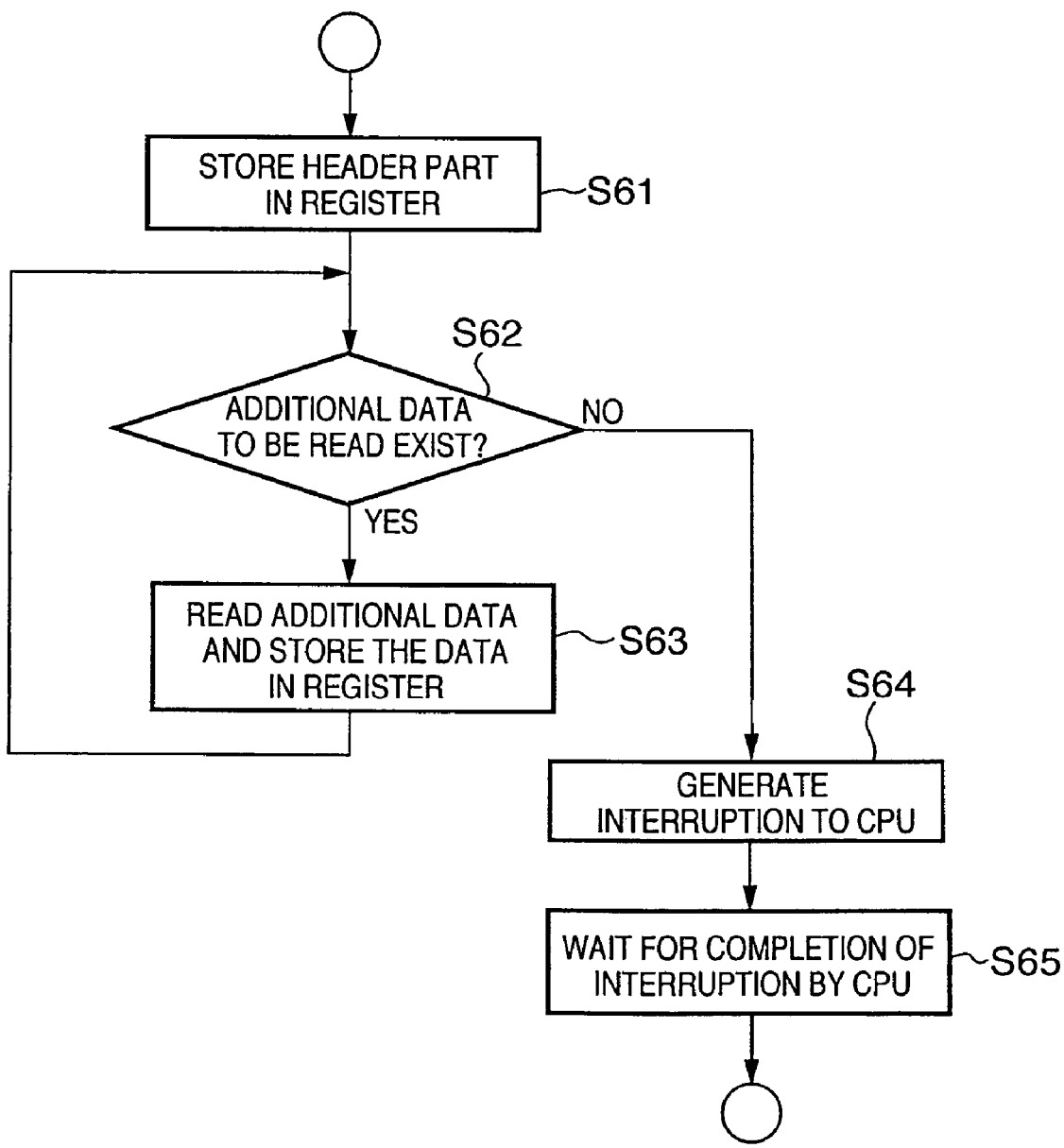
FIG. 5B is a flow chart explaining received packet processing according to a second embodiment.

In this case, the processing operations of steps S56 to S60 shown in FIG. 5A are replaced by those of S61 to S65 shown in FIG. 5B.

When the received packet is the command packet, the header part is first stored in the command register 405 in step S61. While the additional data to be read exist (which is judged by the packet size of the header part 301), the additional data are read from the FIFO memory 205 for host, and stored in the command register 405 (steps S62, S63). In this way, when the whole received packet is stored in the command register 405, an interruption to the CPU 202 is generated in step S64. When the CPU 202 confirms that the data stored in the command register 405 are read, the processing is completed (step S65).

FIG. 7B shows a timing chart at the time of the command packet processing in the printer controller 201 according to the second embodiment. The command register 405 controls the FIFORD signal in accordance with the amount of data described in the data size, thereby making data successively read from the FIFO memory 205 for host to the FIFO controller 401 for host. For example, in FIG. 7B, additional data of D0 to D2 are read in each timing of T6 to T8 on the basis of RD signal from T5 to T7. The data successively read from the FIFO memory 205 for host are stored in the command register 405 (501 in FIG. 7B, steps S61 to S63). After the whole received packet is stored, an interruption is generated to the CPU 202 (502 in FIG. 7B, step S64).

According to the above described second embodiment, the intervention of the CPU 202 in receiving the command packet can be reduced so that the processing speed can be improved in comparison with the first embodiment.

Third Embodiment

In the first and second embodiments, whether the received packet is the command packet or the data packet is determined without the intervention of the CPU 202. When the received packet is the command packet, the CPU 202 is interrupted so that the command packet is provided for the CPU 202. That is, in the first and second embodiments, the operation of the FIFO memory 205 for host in relation to the command packet is performed synchronously with the reading operation of the CPU 202. In a third embodiment, a FIFO memory for the command packet is prepared, and the command packet and the data packet can be continuously received without the intervention of the CPU 202, as a result of which the processing speed is improved.

Figure 10:
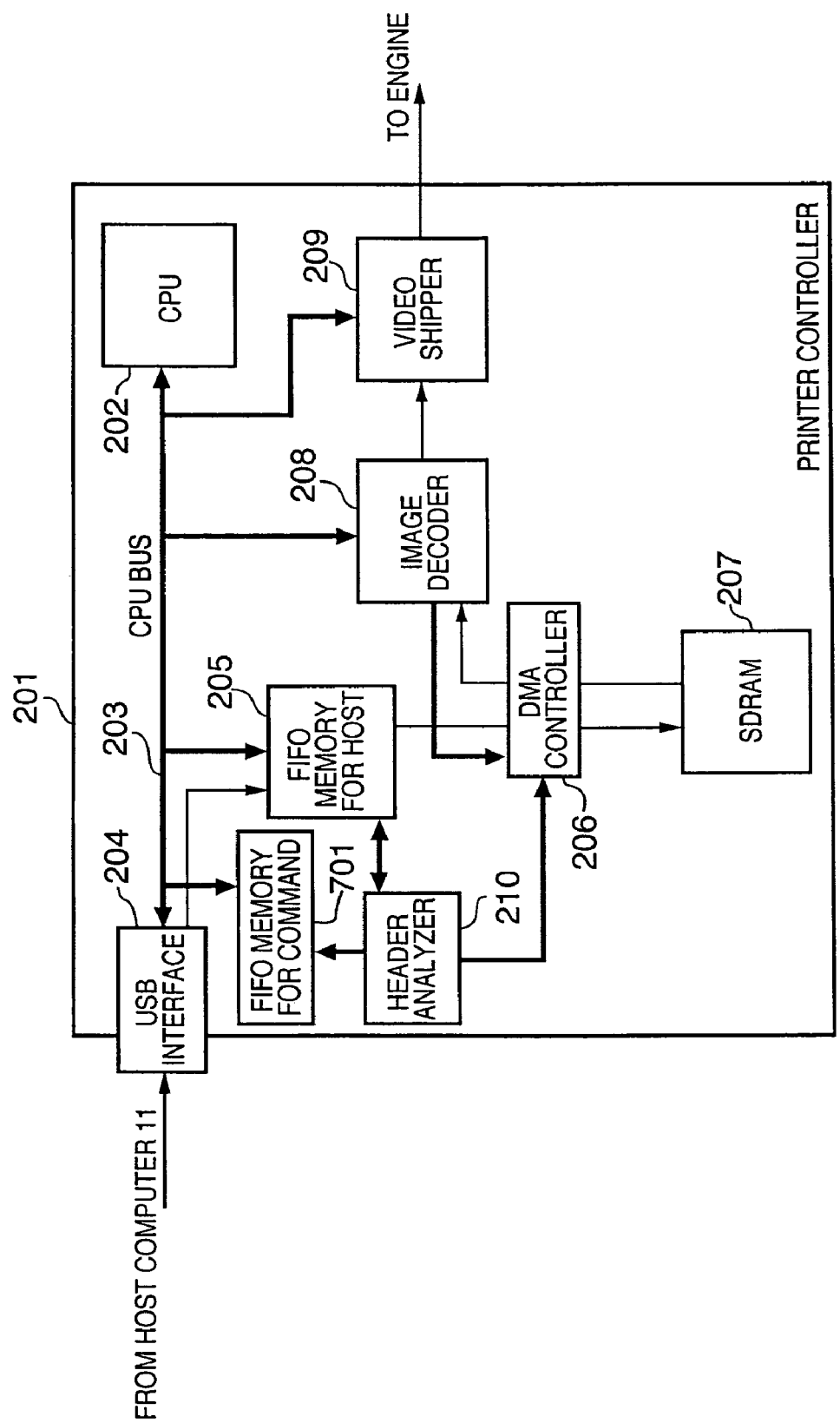
FIG. 10 is a block diagram showing a configuration of a printer controller according to a third embodiment.

FIG. 10 is a block diagram showing a configuration of a printer controller according to the third embodiment. In FIG. 10, the same parts as those in FIG. 2 are denoted by the same reference numerals. In comparison with the header analyzer (FIG. 2) according to the first embodiment, the configuration shown in FIG. 10 is different in that a FIFO memory 701 for command which serves to deliver the command packet to the CPU 202 is provided between the header analyzer 210 and the CPU bus 203.

Figure 11:
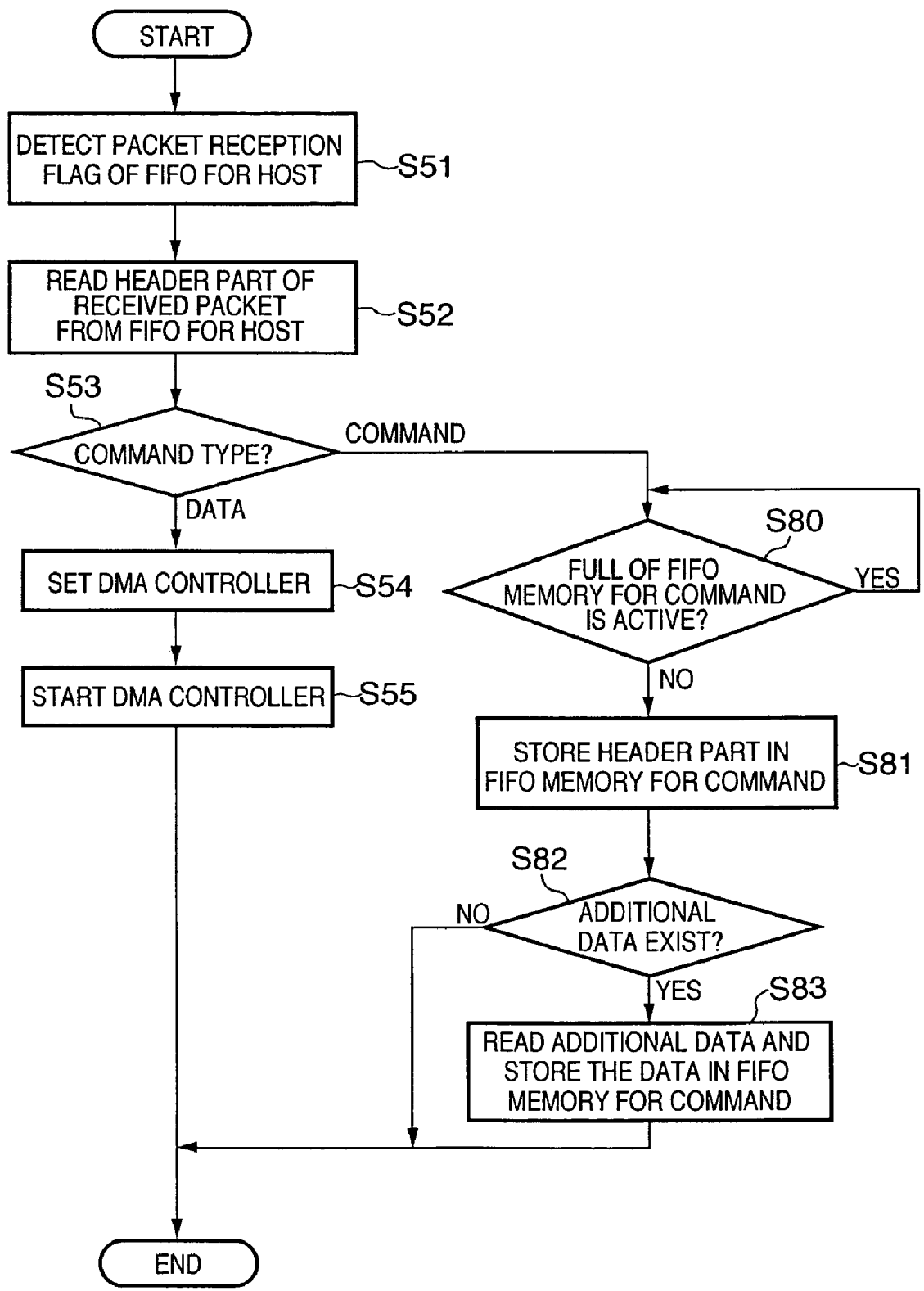
FIG. 11 is a flow chart explaining received packet processing according to the third embodiment.

FIG. 11 is a flow chart explaining the operation of the header analyzer 210 according to the third embodiment. The operation (steps S51 to S55) at the time of receiving the data packet is the same as that of the first embodiment, and hence, the explanation thereof is omitted.

Upon receipt of the command packet, the header analyzer 210 advances the processing from step S53 to step S80, so as to determine whether the FIFO memory 701 for command can receive data or not. When the FIFO memory 701 for command is in the state of Full and unable to receive data, the header analyzer 210 waits that the Full state is canceled. When the FIFO memory 701 for command is not in the Full state, the header analyzer 210 advances to step S81 and stores data in the header part outputted from the FIFO memory for host in the FIFO memory for command. Subsequently, in step S82, the header analyzer 210 determines whether the data part 302 (additional data) of the packet exists or not. When the data part 302 exists, the header analyzer 210 read in step S83 the additional data from the FIFO memory 205 for host, and stores the read additional data in the FIFO memory 701 for command. In this way, the header analyzer 210 stores the whole received packet in the FIFO memory 701 for command.

Upon completion of the data storage operation, the FIFO memory 701 for command generates an interruption to the CPU 202. The CPU 202 receives the interruption and reads the command packet from the FIFO memory 701 for command.

Figure 12:
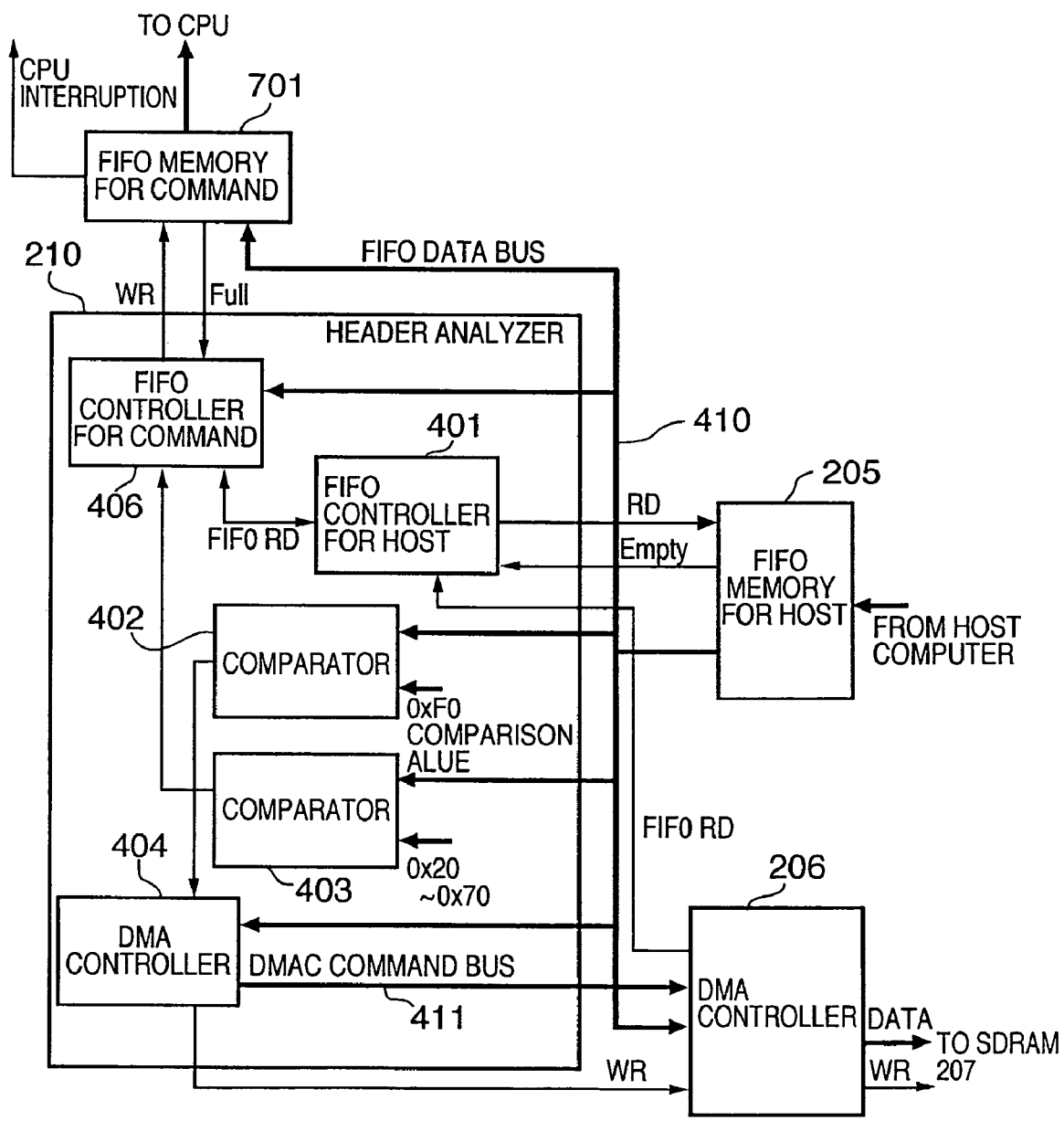
FIG. 12 is a block diagram showing a configuration of a header analyzer according to the third embodiment.

FIG. 12 is a block diagram showing a detailed configuration of the header analyzer 210 according to the third embodiment. The same portions in FIG. 12 as those shown in FIG. 6 are denoted by the same reference numerals. In the third embodiment, the FIFO controller 406 for command is provided instead of the command register 405. The FIFO controller 406 for command controls the FIFO memory 701 for command.

Figure 13:
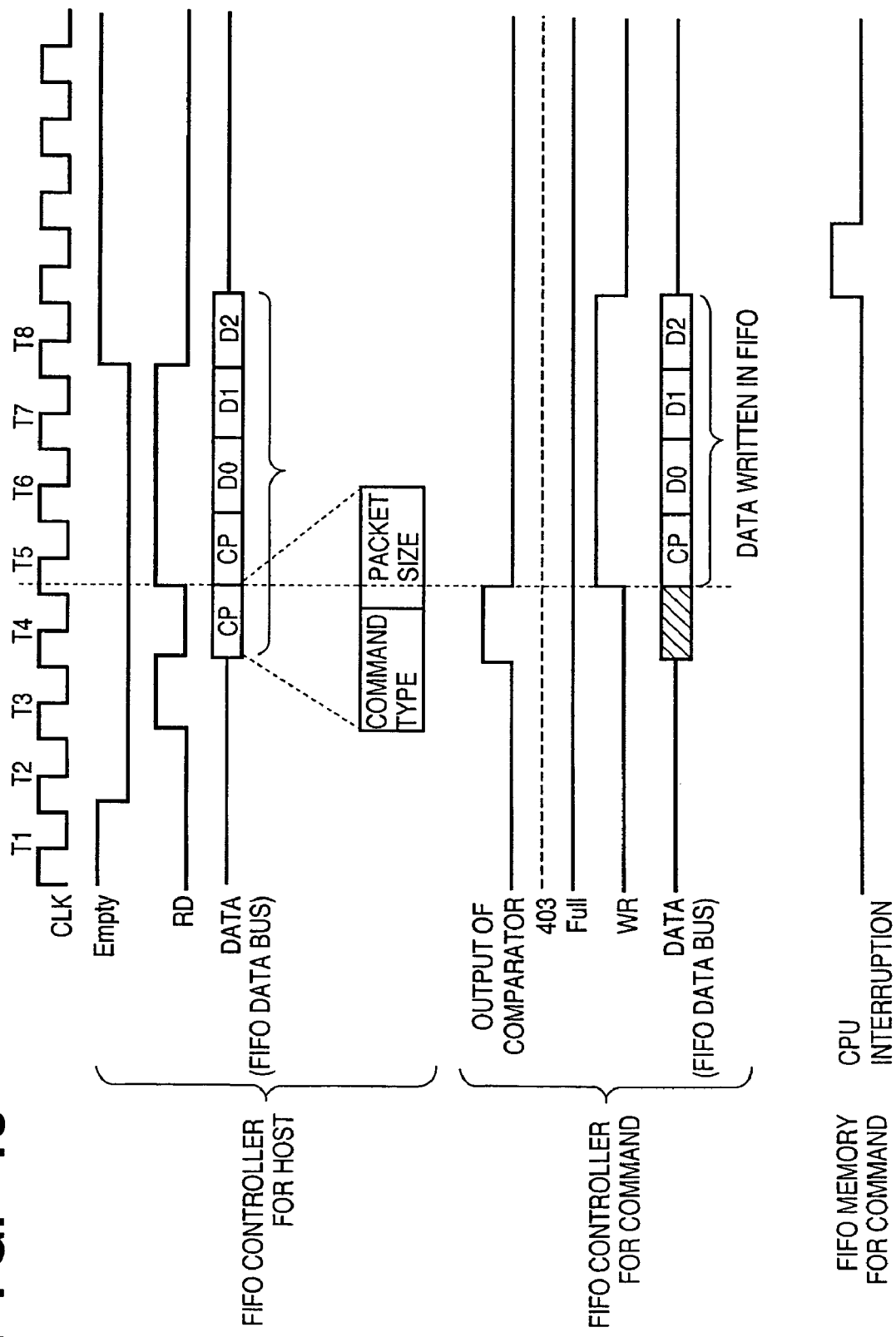
FIG. 13 is a timing chart at the time of command packet processing in the header analyzer according to the third embodiment.

FIG. 13 is a timing chart showing processing of the command packet according to the third embodiment. Note that timing chart in the case of the data packet is the same as that of the first embodiment (FIG. 8), and hence, the explanation thereof is omitted. In the following, the processing operation on the command packet performed by the header analyzer 210 according to the third embodiment is explained in detail by using FIG. 12 and FIG. 13.

In FIG. 12, a packet received from the host computer 11 is stored in the FIFO memory 205 for host. When the packet exists in the FIFO memory 205 for host, the Empty signal from the FIFO memory 205 for host is made Inactive (at T2 in FIG. 13). This means that the packet is received (step S51 in FIG. 11). Thereby, the FIFO controller 401 for host makes the RD signal Active, in order to read the received data from the FIFO memory 205 for host (T3). The header part 301 of the received packet is read from the FIFO memory 205 for host by this RD signal (step S52).

As explained in FIG. 3, the command type and the packet size are stored in the read header part 301. In accordance with the contents of the command type, the comparator 402 and the comparator 403 judge whether the received packet is the command or the print data. When the received packet is the command packet, the output of the comparator 403 is made Active (T4). The FIFO controller 406 for command is started by the Active output of the comparator 403. The FIFO controller 406 for command determines whether the FIFO memory 701 for command is in the Full state or not, by the Full signal from the FIFO memory 701 for command (step S80). When the FIFO memory 701 for command is not in the Full state, the FIFO controller 406 for command sends the WR signal to the FIFO memory 701 for command, and makes the data of the header part currently outputted on the FIFO data bus 410, stored in the FIFO memory 701 for command (steps S81, S82).

Subsequently, the FIFO controller 406 for command acquires the packet size in the header part currently outputted on the FIFO data bus 410. Then, the FIFO controller 406 for command controls the FIFORD signal in accordance with this information, and makes the additional data successively outputted from the FIFO memory 205 for host. More specifically, the FIFO controller 406 for command makes by the FIFORD signal the FIFO controller 401 for host generate the RD signal over the number of clock cycles (length) corresponding to the data amount indicated by the packet size. Then, the FIFO controller 406 for command reads the additional data from the FIFO memory 205 for host. The example in FIG. 13 shows a state where the FIFO controller 406 for command determines from the packet size that the RD signal having a length over three clock cycles is needed, and makes the additional data read on the basis of the RD signal having such length. That is, on the basis of the RD signal from T5 to T7, the additional data of D0 to D2 are read by the three clocks of T6 to T8. Further, at this time, the FIFO controller 406 for command controls the WR signal to the FIFO memory 701 for command, so as to make the additional data which are successively outputted from the FIFO memory 205 for host, successively written in the FIFO memory 710 for command (step S82, step S83). Thus, the received packet stored in the FIFO memory 205 for host as a whole, is written in the FIFO memory 701 for command (T5 to T8).

In this way, when the above described transfer operation of the data amount in accordance with the packet size is completed, the FIFO memory 701 for command generates an interruption to the CPU, and completes the processing of the received packet. Note that the interrupt signal may be generated from the FIFO controller 406 for command to the CPU 202. Further, the generation of the interrupt signal to the CPU 202 may be performed in a proper timing such as when the data of the command packet start to be stored in the FIFO memory 701 for command.

Note that the packet processing can be continuously performed in the third embodiment, but there may be a case where a waiting operation is needed before the print data are transferred. In order to cope with such case, the CPU 202 may be configured to perform the wait control over the header analyzer 210.

Further, the third embodiment is configured to transfer the command packet to the FIFO memory 701 for command, but the command packet may be configured to be transferred to the SDRAM 207 similarly to the data packet, so as to make the CPU 202 read the command from the SDRAM 207. In this case, the DMA controller 206 is set so as to make all of the header part and the data part of the command packet transferred to the SDRAM 207.

As described above, according to the third embodiment, the determination of the packet type is configured to be performed by the hardware independent of the CPU 202, so that the same effect as the first embodiment can be attained. Further, in the third embodiment, plural continuous packets are automatically processed without the intervention of the CPU. For example, even in the case where the command packets are continuously transferred and subsequently a data packet is transferred, when the amount of the transferred packets is not more than the amount of packets which can be stored in the FIFO memory 701 for command, the following packet can be processed without waiting for the reading operation of the command packet to be performed by the CPU. Thus, the processing speed can be further improved.

Note that in the above described first to third embodiments, a USB is used for the connection between the host computer 11 and the printer 12, but the connecting form between the host computer 11 and the printer 12 is not limited to the USB. It goes without saying that other known interfaces such as for example a LAN using Ethernet (registered trademark) and the like, and IEEE 1394 interface, can be applied to the connection between the host computer 11 and the printer 12. Further, the above described first to third embodiments are explained by using the form in which the reception of the command packet is notified to the CPU 202 by means of an interruption, but the CPU 202 may be arranged to independently recognize the presence of the reception of the command packet by means of polling and the like. For example, a flag which indicates the presence of reception of the command packet and which is based on the analysis performed by the header analyzer, may be stored in a predetermined memory area of the command register 405 shown in FIG. 6, or in a predetermined memory area of the FIFO memory 701 for command shown in FIG. 12, and the like, so as to make the CPU 202 confirm the state of the flag by the polling. When the presence of the command packet is discriminated by the CPU 202, the data stored in the command register 405 or the FIFO memory 701 for command are read by the CPU 202, so that the data of the command packet are provided for the CPU 202.

As described above, according to the present invention, it is possible to reduce the processing load of a processor which executes a program to perform various processings, and to discriminate the type of received data at a high speed, as a result of which the processing speed of the received data can be increased.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-113953, filed on Apr. 11, 2005, which is hereby incorporated by reference herein in its entirety.

What is claimed is:

1. A print controller for processing a print job by a processor which realizes various processes by executing a program, and by a hardware circuit which differs from the processor and interacts with the processor, the print controller comprising:
 a determination unit which is constituted by the hardware circuit, which reads from a first memory a header part of a packet received from an external apparatus and stored in the first memory, and which determines a type of the packet on the basis of data in the header part of the packet;
 a provision unit which is constituted by the hardware circuit, which reads from the first memory data part following the header part of the packet, and provides the header part and the data part for the processor when the packet is determined to be a command packet by said determination unit;
 a transfer unit which is constituted by the hardware circuit and transfers print data included in the packet from the first memory to a second memory without an intervention of the processor when the packet is determined to be a data packet by said determination unit; and
 a recording control unit which causes recording to a recording medium on the basis of print data stored in the second memory.

2. The print controller according to claim 1, wherein said provision unit provides the read data for the processor with a single read operation of data from the first memory as a unit.

3. The print controller according to claim 1, wherein said provision unit stores the packet read from the first memory in a register, and provides the packet for the processor when reading of the whole packet is completed.

4. The print controller according to claim 1, wherein provision of data for the processor by said provision unit is effected by generating an interrupt signal to the processor.

5. The print controller according to claim 1, wherein provision of data for the processor by said provision unit is effected by a reading operation of data in a command packet by the processor, on the basis of polling performed by the processor for checking the presence of the command packet.

6. The print controller according to claim 1, wherein said provision unit comprises:
 a unit configured to transfer the packet stored in the first memory to a memory which can be accessed by the processor; and
 a unit configured to generate an interrupt signal to the processor in accordance with the transfer of the packet to the memory.

7. The print controller according to claim 1, wherein said determination unit comprises a first comparison circuit which checks the coincidence between data indicating a predetermined data packet and data in the particular part of the received packet.

8. The print controller according to claim 1, wherein said determination unit comprises a second comparison circuit which checks the coincidence between data indicating a type of a predetermined command packet and data in the particular part of the received packet.

9. The print controller according to claim 1 included in a printer, the printer further comprising a printer engine which performs print output to a recording medium in accordance with print data stored in the second memory.

10. A control method of a print controller performing a print job by a processor which realizes various processes by executing a program, and by a hardware circuit which differs from the processor and interacts with the processor, the method comprising:
 a determination step for reading from a first memory a header part of a packet which is received in the hardware circuit from an external apparatus and stored in the first memory, and for determining a type of the packet on the basis of data in the header part of the packet;
 a provision step in which the hardware circuit reads from the first memory data part following the header part of the packet and provides the header part and the data part for the processor when the packet is determined to be a command packet in said determination step;
 a transfer step in which the hardware circuit transfers print data included in the packet from the first memory to a second memory without an intervention of the processor when the packet is determined to be a data packet in said determination step; and
 a recording control step of controlling to record to a recording medium on the basis of print data stored in the second memory.

11. A computer-readable storage medium storing a computer-executable control program for making a computer execute the control method according to claim 10.

* * * * *